SIGNED TERNARY CARRY GENERATOR USING THRESHOLD LOGIC ELEMENTS

Filed Sept. 30, 1965 2 Sheets-Sheet 1

INVENTOR
WILLIAM H. HANSON
BY Thomas J. Nikolai
ATTORNEY

INVENTOR
WILLIAM H. HANSON
BY Thomas J. Nikolai
ATTORNEY 3,346,730

SIGNED TERNARY CARRY GENERATOR USING THRESHOLD LOGIC ELEMENTS

William H. Hanson, Minneapolis, Minn., assignor to Sperry Rand Corporation, New York, N.Y., a corporation of Delaware Filed Sept. 30, 1965, Ser. No. 491,594
6 Claims. (Cl. 235—175)

ABSTRACT OF THE DISCLOSURE

A signed ternary carry generator utilizing multi-input ternary threshold logic elements for performing ternary arithmetical operations.

Figure 1:
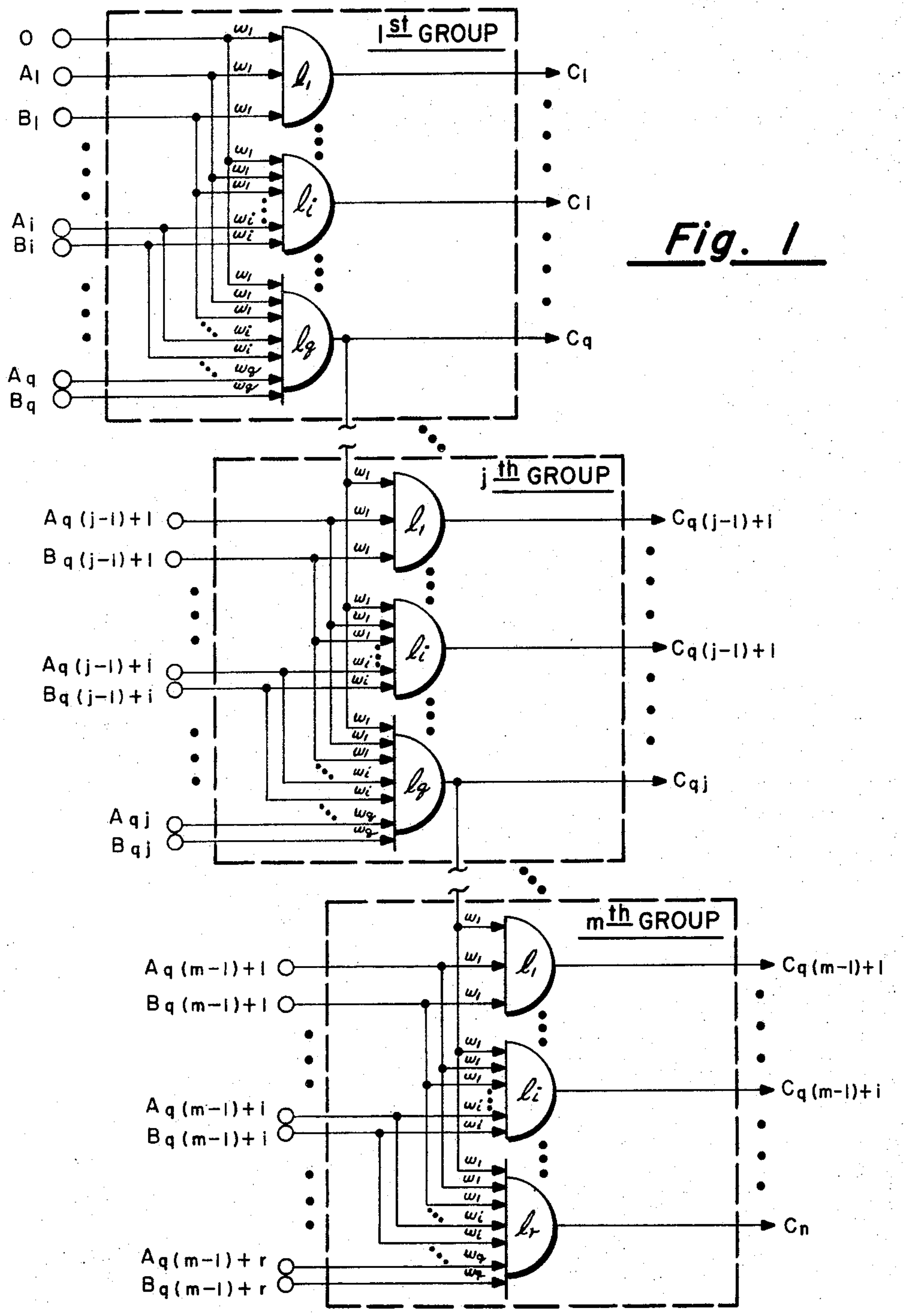

Both the conventional and signed ternary number systems, along with associated arithmetical operations, are defined and discussed in copending patent application Ser. No. 220,183, filed Aug. 29, 1962, and entitled "Data Processing System."

Conventional ternary comparator and carry networks are generally serial in nature and consist of a serial arrangement of ternary carry and comparator stages such as those disclosed in a paper by W. H. Hanson entitled "Ternary Threshold Logic," published in IEEE Transactions on Electronic Computers, vol. EC–12, pp. 191–197; June 1963. Serial networks of this type require a relatively large number of elements and logic levels to effect. Some further properties of ternary threshold logic are discussed in a note by R. Merrill entitled "Some Properties of Ternary Threshold Logic" published in IEEE Transactions on Electronic Computers, vol. EC–13; pp. 632–635; October 1964.

It has been determined that the carry, corresponding to the $q(j-l)+i$ digit-order, of two signed ternary words of the form $A_n \ldots A_k \ldots A_1$ and $B_n \ldots B_k \ldots B_1$ is represented by the logical function, $$C_{q(j-1)+i} = w_i A_{q(j-1)+i} \overset{1_i}{\ } w_i B_{q(j-1)+i} \ldots {}^{1_i} w_1 A_{q(j-1)+1} \overset{1_i}{\ } w_1 B_{q(j-1)+1} \overset{1_i}{\ } w_1 C_{q(j-1)}$$

It has further been determined that a comparison, through the $jq$th digit-order, of two ternary words of the form $A_n \ldots A_k \ldots A_1$ and $B_n \ldots B_k \ldots B_1$ is represented by the logical function, $$K_{jq} = 2w_q A_{qj} {}^t 2w_q \overline{B}_{qj} {}^t \ldots {}^t 2w_i A_{q(j-1)+i} \overset{t}{\ } 2w_i \overline{B}_{q(j-1)+i} \ldots {}^t 2w_1 A_{q(j-1)+i} \overset{t}{\ } 2w_1 \overline{B}_{q(j-1)+i} \, t K_{q(j-1)}$$

It is proposed by this invention to reduce the number of elements and logic levels necessary to generate signals representative of signed ternary carries and ternary comparisons by utilizing these determinations and their logical equivalents.

The invention is effected by employing multi-input ternary threshold logic elements. There are a variety of circuits available, capable of performing the logical threshold function, which are well known in the art (such as described by R. Schauer et al. in "Some Applications of Magnetic Film Parametrons as Logical Devices," IRE Transactions on Electronic Computers, vol. EC–9, pp. 315–320; September 1960) and these circuits, of themselves, do not constitute a part of this invention.

The output, Y, of a ternary threshold logic element having $n$ inputs $X_n \ldots X_k \ldots X_1$ with associated weights $w_n \ldots w_k \ldots w_1$, where $w_k \geq 1$, and threshold $t$, where $$1 \leq t \leq \sum_{k=1}^{n} w_k$$

can be represented as follows:

$$Y = w_n X_n {}^t \ldots {}^t w_k X_k {}^t \ldots {}^t w_1 X_1$$

The value of the ternary threshold logic function, Y, is determined as follows:

In the signed ternary number system;

$$Y = +1 \text{ if } \sum_{k=1}^{n} w_k X_k \geq t$$

$$Y = -1 \text{ if } \sum_{k=1}^{n} w_k X_k \leq -t$$

$Y=0$ in all other cases, where $X_k = +1, 0, -1$ and in the conventional ternary number system;

$$Y = 2 \text{ if } \sum_{k=1}^{n} w_k (X_k - 1) \geq t$$

$$Y = 0 \text{ if } \sum_{k=1}^{n} w_k (X_k - 1) \leq -t$$

$Y=1$ in all other cases, where $X_k = 2, 1, 0$

Figure 2:
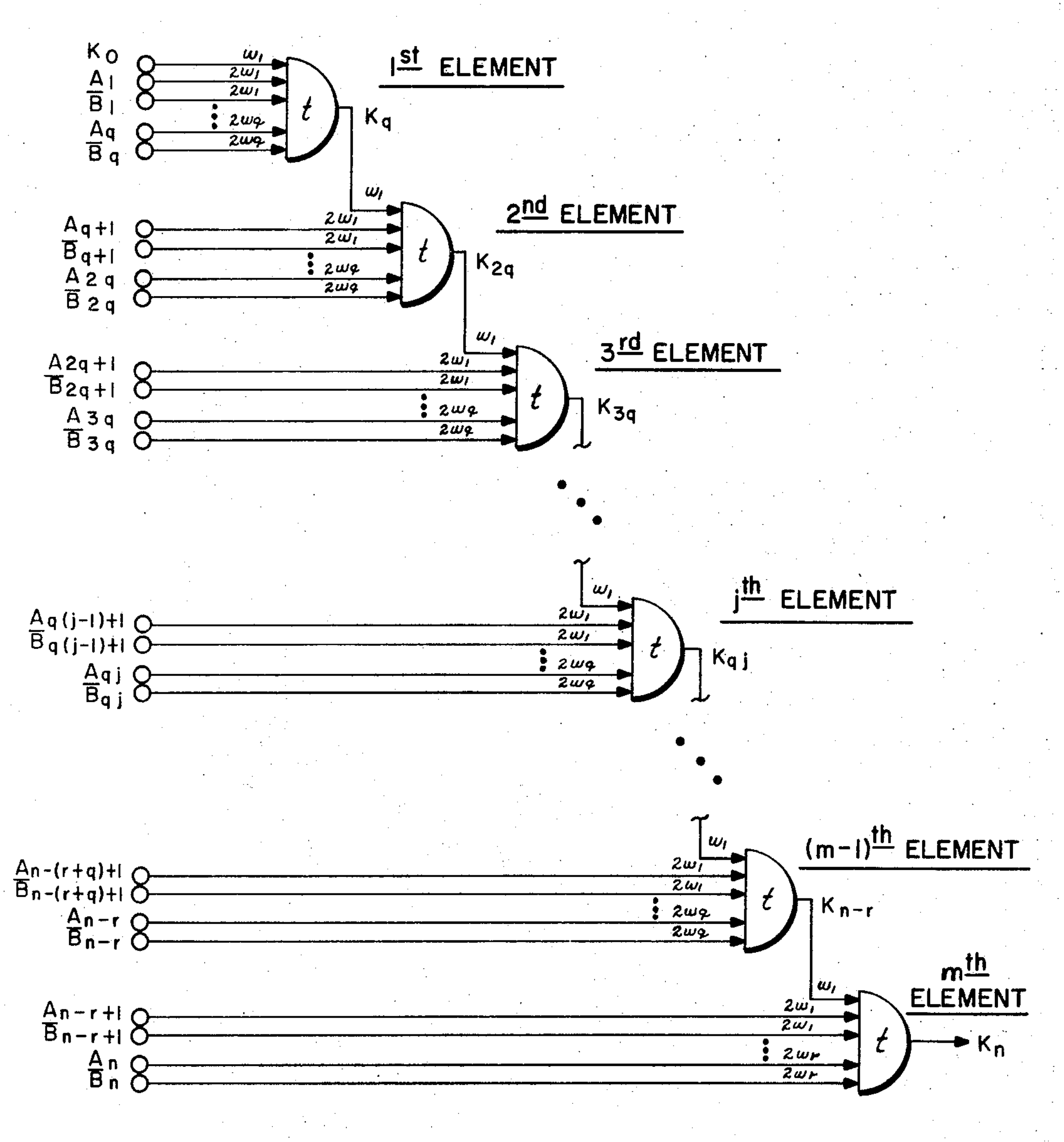

It will thus be seen that by implementing the determinations set forth above with multi-input ternary threshold logic elements a comparison of, and carries formed in the addition of, two ternary words can be realized in a relatively short period of time utilizing a relatively small number of elements. The novel features which are considered characteristic of this invention are set forth with particularity in the appended claims. The invention itself, both as to its organization and method of operation, as well as additional advantages thereof, will be best understood from the following description when read in connection with the accompany drawings, in which:

FIGURE 1 is a logical block diagram of a preferred embodiment of a carry generator designed in accordance with this invention; and FIGURE 2 is a logical block diagram of a preferred embodiment of a comparator designed in accordance with this invention.

The drawings generally show block diagrams of a basic carry generator and comparator designed in accordance with the present invention. In these figures each of the blocks represent a multi-input ternary threshold logic element. The term appearing within each of the blocks represents the threshold of the element. The term appearing at each input to each of the elements represents the weight accorded the associated input.

With reference now to FIGURE 1 of the drawings, a logical block diagram of a carry generator according to the present invention is shown. The carry generator, for generating $n$ signals representative of carries, $C_n \ldots C_k \ldots C_1$, corresponding to an augend of the form $A_n \ldots A_k \ldots A_1$ and an addend of the form $B_n \ldots B_k \ldots B_1$, comprises $m$ signal generating groups arranged in $m$ logic levels. The number of groups, $m$, necessary to generate $n$ signal representations of $C_n \ldots C_k \ldots C_1$, is given by, $\langle n/q \rangle$, where;

$\langle n/q \rangle = n/q$ if the quotient is an integer,
$= n/q$ rounded up to the next higher integer, if the quotient is not an integer, $q = (p-1)/2$, and $p$ is the number of distinct input signals allowed per element. The total number of input signals allowed per element is given by, $3^q$.

Each of the groups, $j=1 \ldots m-1$, receives $q$ signal representations of digit-orders $A_{qj} \ldots A_{q(j-1)+1}$ of the augend, $q$ signal representations of digit-orders $B_{qj} \ldots B_{q(j-1)+1}$ of the addend and a signal representation of $C_{q(j-1)}$, the highest digit-order carry generated by the next lower order group (where, $C_0=0$). Each of these groups generate $q$ carry signals, $C_{qj} \ldots C_{q(j-1)+1}$, as a function only of the digit-order inputs to the group and the highest order carry generated by the next lower order group.

The *m*th group receives *r* signal representations of digit-orders $A_{q(m-1)+r} \ldots A_{q(m-1)+1}$ of the augend, *r* signal representations of digit-orders $$B_{q(m-1)+r} \ldots B_{q(m-1)+1}$$

of the addend, and a signal representation of $C_{q(m-1)}$ the highest order carry generated by the $(m-1)$th group, where *r* is the non-zero remainder of $n/q$. If the remainder of $n/q$ is zero then $r=q$. The *m*th group generates *r* carry signals, $C_n \ldots C_{q(m-1)+1}$, as a function only of the digit-order inputs to the group and the highest order carry generated by the next lower group.

Each of the groups, $j=1 \ldots m-1$, comprises *q* multi-input ternary threshold logic elements arranged in parallel. The *i*th element, $i=1 \ldots q$, of the *j*th group has a threshold of $l_i=(t/2)(3^i+1)(t=1, \ldots)$ and is coupled so as to receive $2i+1$ input signals representative of digit-orders $A_{q(j-1)+i} \ldots A_{q(j-1)+1}$ of said augend, digit-orders $B_{q(j-1)+i} \ldots B_{q(j-1)+1}$ of said addend, and $C_{q(j-1)}$, the latter being representative of the highest digit-order carry generated by the next lower order group. Each of said digit-order inputs is weighted by a factor $$w_i=(t)(3^{i-1})$$

and $C_{q(j-1)}$ is weighted by a factor of $w_1$. The *i*th element of the *j*th group utilizes said digit-order and carry input signals to generate a signal in accordance with the logical function:

$$C_{q(j-1)+i}=w_iA_{q(j-1)+i}{}^{l_i}w_iB_{q(j-1)+i}{}^{l_i} \ldots {}^{l_i}w_1A_{q(j-1)+1}{}^{l_i}w_1B_{q(j-1)+1}{}^{l_i}w_1C_{q(j-1)}$$

where $j=1 \ldots m-1$ and for each *j*, $i=1 \ldots q$.

The *m*th group is comprised of *r* multi-input ternary threshold logic elements arranged in parallel. The *i*th element, $i=1, \ldots r$, of the *m*th group has a threshold of $l_i=(t/2)(3^i+1)(t=1, \ldots)$ and is coupled so as to receive $2i+1$ input signals representative of digit-orders $A_{q(m-1)+i} \ldots A_{q(m-1)+1}$ of said augend, digit-orders $B_{q(m-1)+i} \ldots B_{q(m-1)+1}$ of said addend, and $C_{q(m-1)}$, the latter being representative of the highest digit-order carry generated by the next lower order group, $m-1$. Each of said digit-order inputs are weighted by a factor $w_i=(t)(3^{i-1})$ and $C_{q(m-1)}$ is weighted by a factor of $w_1$. The *i*th element of the *m*th group utilizes said digit-order and carry signals to generate a signal in accordance with the logical function:

$$C_{q(m-1)+i}=w_iA_{q(m-1)+i}{}^{l_i}w_iB_{q(m-1)+i}{}^{l_i} \ldots {}^{l_i}w_1A_{q(m-1)+1}{}^{l_i}w_1B_{q(m-1)+1}{}^{l_i}w_1C_{q(m-1)}$$

where $i=1 \ldots r$.

Following are two examples of specific signed ternary carry generators designed in accordance with this invention. These examples are intended as illustrative only and are not to be construed as limiting.

Let $p=5$, $t=1$, and $n=30$. Then $q=2$, $m=15$, $r=2$, $w_i=3^{i-1}$, and $l_i=\frac{1}{2}(3^i+1)$. With these parameters given the specific carry generator is defined by the following logical functions:

First group: $C_1=A_1{}^2B_1{}^2C_0$
$C_2=3A_2{}^53B_2{}^5A_1{}^5B_1{}^5C_0$

Second group: $C_3=A_3{}^2B_3{}^2C_2$
$C_4=3A_4{}^53B_4{}^5A_3{}^5B_3{}^5C_2$

Third group: $C_5=A_5{}^2B_5{}^2C_4$
$C_6=3A_6{}^53B_6{}^5A_5{}^5B_5{}^5C_4$

Fourth group: $C_7=A_7{}^2B_7{}^2C_6$
$C_8=3A_8{}^53B_8{}^5A_7{}^5B_7{}^5C_6$

.
.
.

*j*th group: $C_{2(j-1)+1}=A_{2(j-1)+1}{}^2B_{2(j-1)+1}{}^2C_{2(j-1)}$
$C_{2(j-1)+2}=3A_{2(j-1)+2}{}^53B_{2(j-1)+2}{}^5A_{2(j-1)+1}{}^5B_{2(j-1)+1}{}^5C_{2(j-1)}$

.
.
.

Fourteenth group: $C_{27}=A_{27}{}^2B_{27}{}^2C_{26}$
$C_{28}=3A_{28}{}^53B_{28}{}^5A_{27}{}^5B_{27}{}^5C_{26}$ Fifteenth group: $C_{29}=A_{29}{}^2B_{29}{}^2C_{28}$
$C_{30}=3A_{30}{}^53B_{30}{}^5A_{29}{}^5B_{29}{}^5C_{28}$ Let $p=7$, $t=1$, and $n=29$. Then $q=3$, $m=10$, $r=2$, $w_i=3^{i-1}$, and $l_i=\frac{1}{2}(3^i+1)$. With these parameters given the specific carry generator is defined by the following logical functions:

First group: $C_1=A_1{}^2B_1{}^2C_0$
$C_2=3A_2{}^53B_2{}^5A_1{}^5B_1{}^5C_0$
$C_3=9A_3{}^{14}9B_3{}^{14}3A_2{}^{14}3B_2{}^{14}A_1{}^{14}B_1{}^{14}C_0$ Second group: $C_4=A_4{}^2B_4{}^2C_3$
$C_5=3A_5{}^53B_5{}^5A_4{}^5B_4{}^5C_3$
$C_6=9A_6{}^{14}9B_6{}^{14}3A_5{}^{14}3B_5{}^{14}A_4{}^{14}B_4{}^{14}C_3$

.
.
.

*j*th group: $C_{3(j-1)+1}=A_{3(j-1)+1}{}^2B_{3(j-1)+1}{}^2C_{3(j-1)}$
$C_{3(j-1)+2}=3A_{3(j-1)+2}{}^53B_{3(j-1)+2}{}^5A_{3(j-1)+1}{}^5B_{3(j-1)+1}{}^5C_{3(j-1)}$
$C_{3(j-1)+3}=9A_{3(j-1)+3}{}^{14}9B_{3(j-1)+3}{}^{14}3A_{3(j-1)+2}{}^{14}3B_{3(j-1)+2}{}^{14}A_{3(j-1)+1}{}^{14}B_{3(j-1)+1}{}^{14}C_{3(j-1)}$

.
.
.

Ninth group: $C_{25}=A_{25}{}^2B_{25}{}^2C_{24}$
$C_{26}=3A_{26}{}^53B_{26}{}^5A_{25}{}^5B_{25}{}^5C_{24}$
$C_{27}=9A_{27}{}^{14}9B_{27}{}^{14}3A_{26}{}^{14}3B_{26}{}^{14}A_{25}{}^{14}B_{25}{}^{14}C_{24}$ Tenth group: $C_{28}=A_{28}{}^2B_{28}{}^2C_{27}$
$C_{29}=3A_{29}{}^53B_{29}{}^5A_{28}{}^5B_{28}{}^5C_{27}$ With reference now to FIGURE 2 of the drawings, a logical block diagram of a comparator according to the present invention is shown. The comparator, for generating a signal, $K_n$, representative of a comparison of two ternary words of the form $A_n \ldots A_k \ldots A_1$ and $B_n \ldots B_k \ldots B_1$, comprises *m* multi-input ternary threshold logic elements arranged in *m* logic levels. The number of elements, *m*, necessary to generate $K_n$ is given by, $\langle n/q \rangle$, where:

$\langle n/q \rangle = n/q$, if the quotient is an integer,
$= n/q$ rounded up to the next higher integer, if the quotient is not an integer, $q=(p-1)/2$, and *p* is the number of distinct input signals allowed per element. The total number of input signals allowed per element is given by $(2)(3^q)-1$.

Each of the elements, $j=1 \ldots m-1$, receive $2q$ signal representations of digit-orders $A_{qj} \ldots A_{q(j-1)+1}$ and $\overline{B}_{qj} \ldots \overline{B}_{q(j-1)+1}$, of the words to be compared, A and B, and a signal representation of $K_{q(j-1)}$, the signal generated by the next lower order element. Each of these elements generates a signal $K_{qj}$, representative of a comparison through the *qj* digit order. The *m*th element receives $2r$ signal representations of digit-orders $A_n \ldots A_{n-r+1}$ and $\overline{B}_n \ldots \overline{B}_{n-r+1}$, of the words to be compared, A and B, and a signal representation of $K_{n-r}$, the signal generated by the $(m-1)$th element, where *r* is the non-zero remainder of $n/q$. If the remainder of $n/q$ is zero then $r=q$. The *m*th element generates a signal representative of $K_n$.

Each of the elements $j=1 \ldots m-1$ has a threshold of $t (t=1, \ldots)$ and is coupled so as to receive $2q+1$ input signals representative of digit-orders $A_{qj} \ldots A_{q(j-1)+1}$, $\overline{B}_{qj} \ldots \overline{B}_{q(j-1)+1}$, and $K_{q(j-1)}$, the latter being representative of the signal generated by the next lower order element. Each of said digit-order inputs are weighted by a factor $2w_i=(2t)(3^{i-1})$ and $K_{q(j-1)}$ is weighted by a factor of $w_1$. The *j*th element utilizes said digit-order and comparison signals to generate a signal in accordance with the logical function:

$$K_{qj}=2w_q A_{qj}{}^t 2w_q \overline{B}_{qj}{}^t \ldots {}^t 2w_i A_{q(j-1)+i}{}^t 2w_i \overline{B}_{q(j-1)+i}{}^t \ldots {}^t 2w_1 A_{q(j-1)+1}{}^t 2w_1 \overline{B}_{q(j-1)+1}{}^t t K_{q(j-1)}$$

where $j=1 \ldots m-1$ and for each *j*, $i=1 \ldots q$.

The *m*th element has a threshold of *t* and is coupled so as to receive $2r+1$ input signals representative of digit-orders $A_n \ldots A_{n-r+1}$, $\overline{B}_n \ldots \overline{B}_{n-r+1}$, and $K_{n-r}$, the latter being representative of the signal generated by the $(m-1)$th element. Each of said digit-order inputs are weighted by a factor $2w_i=(2t)3^{i-1}$ and $K_{n-r}$ is weighted by a factor of $w_1$. The *m*th element utilizes said digit-order and comparison signals to generate a signal in accordance with the logical function:

$$K_n=2w_r A_n{}^t 2w_r \overline{B}_n{}^t \ldots {}^t 2w_i A_{2(m-1)+i}{}^t 2w_i \overline{B}_{2(m-1)+i}{}^t \ldots {}^t 2w_1 A_{n-r+1}{}^t 2w_1 \overline{B}_{n-r+1}{}^t t K_{n-r}$$

where $i=1 \ldots r$.

Control signal $K_0$, an input to the first element, determines what condition $K_n$ will detect, in accordance with the following:

$K_0=1$: $K_n=1$ implies $A \geq B$; $K_n=-1$ implies $A<B$ $K_0=0$: $K_n=1$ implies $A>B$; $K_n=0$ implies $A=B$; $K_n=-1$ implies $A<B$ $K_0=-1$: $K_n=1$ implies $A>B$; $K_n=-1$ implies $A \geq B$ Following are two examples of specific ternary comparators designed in accordance with this invention. These examples are intended as illustrative only and are not to be construed as limiting.

Let $p=5$, $t=1$, and $n=30$. Then $q=2$, $m=15$, $r=2$, and $2w_i=(2)(3^{i-1})$. With these parameters given the specific comparator is defined by the following logical functions.

First element: $K_2=6A_2{}^1 6\overline{B}_2{}^1 2A_1{}^1 2\overline{B}_1{}^1 K_0$
Second element: $K_4=6A_4{}^1 6\overline{B}_4{}^1 2A_3{}^1 2\overline{B}_3{}^1 K_2$
Third element: $K_6=6A_6{}^1 6\overline{B}_6{}^1 2A_5{}^1 2\overline{B}_5{}^1 K_4$
Fourth element: $K_8=6A_8{}^1 6\overline{B}_8{}^1 2A_7{}^1 2\overline{B}_7{}^1 K_6$
.
.
.
$j^{th}$ element: $K_{2j}=6A_{2j}{}^1 6\overline{B}_{2j}{}^1 2A_{2j-1}{}^1 2\overline{B}_{2j-1}{}^1 K_{2j-2}$
.
.
.
Fourteenth element: $K_{28}=6A_{28}{}^1 6\overline{B}_{28}{}^1 2A_{27}{}^1 2\overline{B}_{27}{}^1 K_{26}$
Fifteenth element: $K_{30}=6A_{30}{}^1 6\overline{B}_{30}{}^1 2A_{29}{}^1 2\overline{B}_{29}{}^1 K_{28}$ Let $p=7$, $t=1$, and $n=29$. Then $q=3$, $m=10$, $r=2$, and $2w_i=(2)(3^{i-1})$. With these parameters given the specific comparator is defined by the following logical functions.

First element: $K_3=18A_3{}^1 18\overline{B}_3{}^1 6A_2{}^1 6\overline{B}_2{}^1 2A_1{}^1 2\overline{B}_1{}^1 K_0$
Second element: $K_6=18A_6{}^1 18\overline{B}_6{}^1 6A_5{}^1 6\overline{B}_5{}^1 2A_4{}^1 2\overline{B}_4{}^1 K_3$
.
.
.
$j^{th}$ element: $K_{3j}=18A_{3j}{}^1 18\overline{B}_{3j} 6A_{3j-1}{}^1 6\overline{B}_{3j-1}{}^1 2A_{3j-2}{}^1 2\overline{B}_{3j-2}{}^1 K_{3(j-1)}$
.
.
.
Ninth element: $K_{27}=18A_{27}{}^1 18\overline{B}_{27}{}^1 6A_{26}{}^1 6\overline{B}_{26}{}^1 2A_{25}{}^1 2\overline{B}_{25}{}^1 K_{24}$
Tenth element: $K_{29}=6A_{29}{}^1 6\overline{B}_{29}{}^1 2A_{28}{}^1 2\overline{B}_{28}{}^1 K_{27}$ The number of distinct input signals allowed per element, $p$ (or the total number of input signals allowed per element), is determined by the specific type of hardware utilized to implement the invention. The factor, $t$, which is utilized in determining the threshold of the various elements is preferably one; however any other integral value will render the invention operative.

It is understood that suitable modifications may be made in the structure as disclosed provided such modifications come within the spirit and scope of the appended claims. Having now, therefore, fully illustrated and described my invention, what I claim to be novel and desire to protect by Letters Patent is:

What is claimed is:

1. A signed ternary carry generator, for generating $n$ signals $C_n \ldots C_k \ldots C_1$ representative of carries corresponding to two ternary words the augend of which has the form $A_n \ldots A_k \ldots A_1$ and an addend of which has the form $B_n \ldots B_k \ldots B_1$, comprising:

$m$ carry generating groups for generating signal representations of $C_n \ldots C_k \ldots C_1$, each of said carry generating groups $j=1, \ldots m-1$, coupled to the next lower carry generating group, for generating $q$ signals representative of carries $C_{qj} \ldots C_{q(j-1)+1}$ corresponding to digit-orders $A_{qj} \ldots A_{q(j-1)+1}$ of said augend and digit-orders $B_{qj} \ldots B_{q(j-1)+1}$ of said addend comprising:

input means for receiving signal representations of digit-orders $A_{qj} \ldots A_{q(j-1)+1}$, $B_{qj} \ldots B_{q(j-1)+1}$, and carry signal $C_{q(j-1)}$, the latter being representative of the highest digit-order carry generated by the next lower carry generating group, and a plurality of multi-input ternary threshold logic elements coupled to said input means for utilizing said digit-order and carry signals to generate $q$ signals representative of the carries $C_{qj} \ldots C_{q(j-1)+1}$ in accordance with the logical function, $$C_{q(j-1)+i} = w_i A_{q(j-1)+i} {}^{l_i} w_i B_{q(j-1)+i} {}^{l_i} \ldots {}^{l_i} w_1 A_{q(j-1)+1} {}^{l_i} w_1 B_{q(j-1)+1} {}^{l_i} w_1 C_{q(j-1)}$$

said carry generating group, $j=m$, coupled to the next lower carry generating group, for generating $r$ signals representative of the carries $C_n \ldots C_{q(m-1)+1}$ corresponding to digit-orders $A_n \ldots A_{q(m-1)+1}$ of said augend and digit-orders $B_n \ldots B_{q(m-1)+1}$ of said addend comprising:

input means for receiving signal representations of digit-orders $A_n \ldots A_{q(m-1)+1}$, $B_n \ldots B_{q(m-1)+1}$ and carry signal $C_{q(m-1)}$, the latter being representative of the highest digit-order carry generated by the next lower carry generating group, and $r$ multi-input ternary threshold input logic elements coupled to said input means for utilizing said digit-order and carry signals to generate $r$ signals representative of $C_n \ldots C_{q(m-1)+1}$ in accordance with the logical function, $$C_{q(m-1)+i} = w_i A_{q(m-1)+i} {}^{l_i} w_i B_{q(m-1)+i} {}^{l_i} \ldots {}^{l_i} w_1 A_{q(m-1)+1} {}^{l_i} w_1 B_{q(m-1)+1} {}^{l_i} C_{q(m-1)}$$

2. A carry generator as defined in claim 1 in which each of said groups of multi-input ternary threshold logic elements are signed ternary logic elements arranged such that said carry signal representations are generated in $m$ logic levels.

3. A carry generator as defined in claim 2 in which $m$ is defined by the function $\langle n/q \rangle$, $q=(p-1)/2$, $p$ is the number of distinct input signals per threshold element, and $r$ is the non-zero remainder of $n/q$.

4. A carry generator as defined in claim 3 in which each of said networks are comprised of $q$ signed ternary threshold logic elements arranged in parallel.

5. A carry generating group, $j$, for generating $q$ signals representative of $C_{qj} \ldots C_{q(j-1)+1}$ corresponding to digit-orders $A_{qj} \ldots A_{q(j-1)+1}$ of an augend of the form $A_n \ldots A_k \ldots A_1$ and digit-orders $B_{qj} \ldots B_{q(j-1)+1}$ of an addend of the form $B_n \ldots B_k \ldots B_1$, comprising:

input means for receiving signal representations of digit-orders $A_{qj} \ldots A_{q(j-1)+1}$, $B_{qj} \ldots B_{q(j-1)+1}$, and carry signal $C_{q(j-1)}$, the latter being representative of the highest digit-order carry generated by a next lower carry generating group, and a plurality of multi-input ternary threshold logic elements coupled to said input means for utilizing said digit-order and carry signals to generate signals representative of $C_{qj} \ldots C_{q(j-1)+1}$ in accordance with the logical function, $$C_{q(j-1)+i} = w_i A_{q(j-1)+i} {}^{l_i} w_i B_{q(j-1)+i} {}^{l_i} \ldots {}^{l_i} w_1 A_{q(j-1)+1} {}^{l_i} w_1 B_{q(j-1)+1} {}^{l_i} w_1 C_{q(j-1)}$$

where $i$ designates a particular element in said group, $w_i$=the weight of the individual digit-order inputs to said particular element and $l_i$ is the threshold of said particular element.

6. A carry generating group as defined in claim 5 in which said plurality of multi-input ternary threshold logic elements are signed ternary threshold logic elements arranged such that said carry signal representations are generated in one logic level.

References Cited

UNITED STATES PATENTS 3,202,806 8/1965 Menne ------------- 235—175

MALCOLM A. MORRISON, *Primary Examiner.*

V. SIBER, *Assistant Examiner.*